United States Patent
Nejo et al.

(10) Patent No.: US 10,059,369 B2
(45) Date of Patent: Aug. 28, 2018

(54) ELECTRIC POWER STEERING APPARATUS

(71) Applicant: NSK LTD., Tokyo (JP)

(72) Inventors: Sakae Nejo, Maebashi (JP); Tomonori Sato, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/571,578

(22) PCT Filed: Jun. 9, 2016

(86) PCT No.: PCT/JP2016/067179
§ 371 (c)(1),
(2) Date: Nov. 3, 2017

(87) PCT Pub. No.: WO2016/199839
PCT Pub. Date: Dec. 15, 2016

(65) Prior Publication Data
US 2018/0154929 A1    Jun. 7, 2018

(30) Foreign Application Priority Data
Jun. 12, 2015 (JP) ................. 2015-119727

(51) Int. Cl.
*B62D 5/08* (2006.01)
*B62D 5/04* (2006.01)
(Continued)

(52) U.S. Cl.
CPC .......... *B62D 5/0463* (2013.01); *B62D 6/003* (2013.01); *B62D 15/0235* (2013.01); *B62D 15/0265* (2013.01); *B62D 15/0285* (2013.01)

(58) Field of Classification Search
CPC .......... B62D 5/0463; B62D 6/08; B62D 6/04; B62D 5/0493; B62D 1/286
(Continued)

(56) References Cited

U.S. PATENT DOCUMENTS 8,442,739 B2 * 5/2013 Kuge .................... B60W 10/06
                                                      180/170

FOREIGN PATENT DOCUMENTS

| JP | 05-170118 A | 7/1993 |
| JP | 10-309961 A | 11/1998 |

(Continued)

OTHER PUBLICATIONS

International Search Report for PCT/JP2016/067179 dated Aug. 30, 2016.

*Primary Examiner* — Nga X Nguyen
(74) *Attorney, Agent, or Firm* — Sughrue Mion, PLLC

(57) ABSTRACT

An electric power steering apparatus that has a torque sensor which detects a steering torque, and a motor control apparatus to control the motor which applies an assist torque, by which steering is assisted, to a steering system of a vehicle, including: a function that switches a control system of the motor between an angle control system to control an angle corresponding to an angle control command value of an automatic steering mode and a torque control system to control a torque corresponding to a torque control command value of a manual steering mode in accordance with a predetermined switching trigger, wherein the steering apparatus variably sets a gradual-changing time corresponding to a command value difference between the angle control command value and the torque control command value when switching from the angle control system to the torque control system by using a gradual-changing.

12 Claims, 7 Drawing Sheets

(51) Int. Cl.
*B62D 6/00* (2006.01)
*B62D 15/02* (2006.01)

(58) Field of Classification Search
USPC .............................. 701/41–43, 51–52, 93–95
See application file for complete search history.

(56) References Cited

FOREIGN PATENT DOCUMENTS

| | | | |
|---|---|---|---|
| JP | 11-078940 | A | 3/1999 |
| JP | 11-286280 | A | 10/1999 |
| JP | 3311277 | B2 | 8/2002 |
| JP | 2004-352001 | A | 12/2004 |

* cited by examiner

PRIOR ART

PRIOR ART

PRIOR ART

ELECTRIC POWER STEERING APPARATUS

CROSS REFERENCE TO RELATED APPLICATIONS

This application is a National Stage of International Application No. PCT/JP2016/067179 filed Jun. 9, 2016, claiming priority based on Japanese Patent Application No. 2015-119727 filed Jun. 12, 2015, the contents of all of which are incorporated herein by reference in their entirety.

TECHNICAL FIELD

The present invention relates to an electric power steering apparatus that has an automatic steering mode (a parking assist, an obstacle avoidance, a lane keeping and soon) and a manual steering mode (a normal steering), and applies an assist force by a motor to a steering system of a vehicle, and in particular to the electric power steering apparatus that variably sets a gradual-changing time corresponding to a command value difference between an angle control command value and a torque control command value when switching from an angle control system of the automatic steering mode to a torque control system of the manual steering mode by using a gradual-changing.

BACKGROUND ART

An electric power steering apparatus (EPS) which has a motor control apparatus, and provides a steering system of a vehicle with a steering assist torque (an assist torque) by means of a rotational torque of a motor, applies the steering assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of a duty of a pulse width modulation (PWM) control.

A general configuration of the conventional electric power steering apparatus will be described with reference to FIG. 1. As shown in FIG. 1, a column shaft (a steering shaft) 2 connected to a handle (a steering wheel) 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Ts of the handle 1, and a motor 20 for assisting a steering force of the handle (the steering wheel) 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a steering assist command value of an assist command (a steering assist command) on the basis of the steering torque Ts detected by the torque sensor 10 and a vehicle speed Vs detected by a vehicle speed sensor 12, and controls a current supplied to the motor 20 by means of a voltage control value Vref obtained by performing compensation or the like to the steering assist command value. A steering angle sensor 14 is not indispensable and may not be provided. It is possible to obtain the steering angle θ from a rotational position sensor which is connected to the motor 20.

A controller area network (CAN) 40 to send/receive various information and signals on the vehicle is connected to the control unit 30, and it is also possible to receive the vehicle speed Vs from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a CPU (Central Processing Unit) (including an MPU (Micro Processor Unit) and an MCU (Micro Controller Unit))), and general functions performed by programs within the CPU are, for example, shown in FIG. 2.

Functions and operations of the control unit 30 will be described with reference to FIG. 2. The steering torque Ts from the torque sensor 10 and the vehicle speed Vs from the vehicle speed sensor 12 are inputted into a current command value calculating section 31. The current command value calculating section 31 calculates a current command value Iref1 based on the steering torque Ts and the vehicle speed Vs using an assist map or the like. The calculated current command value Iref1 is added with a compensation signal CM for improving characteristics from a compensating section 34 at an adding section 32A. The current command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

The subtraction result I (=Irefm−Im) at the subtracting section 32B is proportional-integral-controlled (PI-controlled) at a PI-control section 35. The voltage control value Vref obtained by the PI-control is inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feedback.

The compensating section 34 adds a self-aligning torque (SAT) 34-3 detected or estimated and an inertia compensation value 34-2 at an adding section 34-4. The addition result is further added with a convergence control value 34-1 at an adding section 34-5. The addition result is inputted into the adding section 32A as the compensation signal CM, thereby to improve the control characteristics.

In such an electric power steering apparatus, vehicles that are equipped with an automatic steering control mode such as a parking assist function, an obstacle avoidance function, a lane keeping function and so on, and switch between the automatic steering control mode and a manual steering control mode have emerged in recent years. In the vehicles that are equipped with the parking assist function, an automatic steering control that a target steering angle is set based on data such as a camera (an image) and a distance sensor, and an actual steering angle is controlled to follow-up the target steering angle, is performed.

In the conventional well-known electric power steering apparatus that has a function of the automatic steering mode and the manual steering mode, for example in a parking assist, a back-in parking or a parallel parking is automatically performed by controlling an actuator (a motor) based on a relationship between a traveling distance of the vehicle and a turning steering angle, which is pre-stored. That is, a parking assist apparatus recognizes a parking space from a position sensor such an ultrasonic sensor and outputs a steering angle command value (an angle control command value) to the EPS-side. The EPS position-controls the actual steering angle so as to follow-up the steering angle command value, and then the vehicle is guided into the parking space.

FIG. 3 shows a control system of the electric power steering apparatus having the parking assist mode function. Various data from the camera and the position sensor (the ultrasonic sensor or the like) are inputted into a parking-assist-etc. automatic steering command apparatus 50, a parking-assist steering angle command value θt is inputted into a position control section (an angle control section) 51 in the EPS actuator function via the CAN or the like and a parking-assist performing command is inputted into a parking-assist performing judging section 52 in the EPS actuator function via the CAN or the like. The actual steering angle θr which is a steering angle signal from a steering angle sensor or an external is inputted into the position control section 51 and a judging result of the parking-assist performing judging section 52 is inputted into a torque command value gradual-changing switching section 54. The steering torque Ts of the EPS sensor is inputted into a torque control section 53 in an EPS power assist function and a steering-assist torque command value Tc from the torque control section 53 is inputted into the torque command value gradual-changing switching section 54. A position control torque command value Tp from the position control section 51 is also inputted into the torque command value gradual-changing switching section 54. According to a judging result of the parking-assist performing judging section 52, the steering-assist torque command value Tc and the position control torque command value Tp are switched and s switched result is outputted as the motor torque command value, and the motor is driving-controlled via a current control system.

As well, although the position control section 51 also actually performs a speed control and forms a position/speed control section to input a steering angle speed, the here description is limited to the position control for convenience of the explanation.

In this manner, in a case of a normal power assist, a torque control system is used. Meanwhile, in a case of the automatic driving such as the parking assist, the angle control system (the position control system) is used. When switching between the torque control and the angle control, there are problems that switching is not smoothly performed due to a variation of the control torque and that an unintentional assistance torque is occurred due to the torque variation served as a trigger.

For a conventional system of switching from the angle control (the automatic steering) to the torque control (the manual control), an automatic steering apparatus is disclosed in, for example Japanese Patent No. 3311277 B2 (Patent Document 1). In the automatic steering apparatus of the Patent Document 1, as shown in a broken line of FIG. 4A, in a case that a control amount of the actuator (the motor) decreases when switching from the automatic steering control (the angle control) to the torque control, a steering reaction force which a driver receives from the steering wheel is not sharply varied by linearly decreasing the control amount from a value of the automatic steering control to a value of the torque control for passing a predetermined time $t_0$. As shown in the broken line of FIG. 4B, in a case that the control amount increases when switching from the automatic steering control to the torque control, the steering reaction force which the driver receives from the steering wheel is not quickly varied by linearly increasing the control amount from the value of the automatic steering control to the value of the torque control for passing the predetermined time $t_0$. As a result, it is prevented from generating the excessive turning steering angle due to quickly turning the steering wheel and not obtaining the necessary turning steering angle due to slowly turning the steering wheel.

THE LIST OF PRIOR ART DOCUMENTS

Patent Documents

Patent Document 1: Japanese Patent No. 3311277 B2

SUMMARY OF THE INVENTION

Problems to be Solved by the Invention

However, in the automatic steering apparatus of Patent Document 1, since a difference between the angle control command value and the torque control command value is not considered at all, in a case that the difference between the angle control command value and the torque control command value is large, there are problems that safety is reduced and the driver feels uncomfortable due to a large torque variation which the driver receives.

The present invention has been developed in view of the above-described circumstances, and an object of the present invention is to provide the electric power steering apparatus that has safety and a high performance in which the uncomfortable feeling is reduced, by being varied a gradual-changing time based on the command value difference between the angle control command value and the torque control command value when the gradual-changing process, in which a control system is switched from the angle control (the automatic steering mode) to the torque control (the manual steering mode), is performed.

Means for Solving the Problems

The present invention relates to an electric power steering apparatus that has a torque sensor which detects a steering torque, and a motor control apparatus to control a motor which applies an assist torque, by which steering is assisted, to a steering system of a vehicle, the above-described object of the present invention is achieved by that comprising: a function that switches a control system of the motor between an angle control system to control an angle corresponding to an angle control command value of an automatic steering mode and a torque control system to control a torque corresponding to a torque control command value of a manual steering mode in accordance with a predetermined switching trigger, wherein the electric power steering apparatus variably sets a gradual-changing time corresponding to a command value difference between the angle control command value and the torque control command value when switching from the angle control system to the torque control system by using a gradual-changing.

The above-described object of the present invention is efficiently achieved by that: wherein the command value difference is an absolute value of a difference between the angle control command value and the torque control command value; or wherein the predetermined switching trigger is a turning-ON or a turning-OFF of an automatic steering command; or wherein the turning-ON or the turning-OFF of the automatic steering command is a command of a parking assist, a command of an obstacle avoidance or a command of a lane keeping; or wherein the predetermined switching trigger is a turning-ON or a turning-OFF of a switching command which is given by an internal judgment of the steering torque; or wherein the gradual-changing time is linearly or non-linearly varied corresponding to the command value difference, or wherein the gradual-changing is performed linearly or non-linearly.

Effects of the Invention

According to the electric power steering apparatus of the present invention, the gradual-changing time is varied based on the command value difference between the angle control command value and the torque control command value at a time of the gradual-changing process, in which the control system is switched from the angle control of the automatic steering mode (the obstacle avoidance, the parking assist and so on) to the torque control of the manual steering mode, is performed. When the command value difference is larger, the gradual-changing time is set to a longer gradual-changing time and the control system is switched more gradually. Thus, the electric power steering apparatus that has safety and a high performance in which the uncomfortable feeling to the driver is reduced, can be provided.

MODE FOR CARRYING OUT THE INVENTION

In a conventional motor control system according to an electric power steering apparatus, since a command value difference, which is an absolute value of a difference between an angle control command value of an automatic steering mode and a torque control command value of a manual steering mode, is not considered at all, in a case that the command value difference is large, there are problems that safety is reduced and a driver feels uncomfortable due to a large torque variation which the driver receives. In this connection, in the present invention, when, for example, a turning-ON or a turning-OFF of a vehicle obstacle avoidance command, a turning-ON or a turning-OFF of a parking assist command or a turning-ON or a turning-OFF of a switching command which is given by an internal judgment of a steering torque is inputted as a switching trigger of a turning-ON or a turning-OFF of an automatic steering, and a control system is switched from the angle control system of the automatic steering mode to the torque control system of the manual steering mode, steering which has safety and suppresses an uncomfortable feeling is realized by variably setting a gradual-changing time corresponding to the command value difference (when the command value difference is larger, the gradual-changing time is longer).

For example, in the automatic steering mode for the obstacle avoidance, it is necessary to avoid the obstacle by recognizing the frontward obstacle by means of a camera or a radar, and steering a steering wheel. The control of the electric power steering apparatus is the torque control in normal, and is the angle control in the obstacle avoidance. When the control mode is returned from the obstacle avoidance to the normal control, a gradual-changing time is variably set corresponding to the command value difference.

Embodiments according to the present invention will be described with reference to the drawings in detail. In the present embodiment, the obstacle avoidance is described as an example of the automatic steering mode. Operations of the parking assist, the lane keeping and the like are similar to that of the obstacle avoidance.

Figure 1:
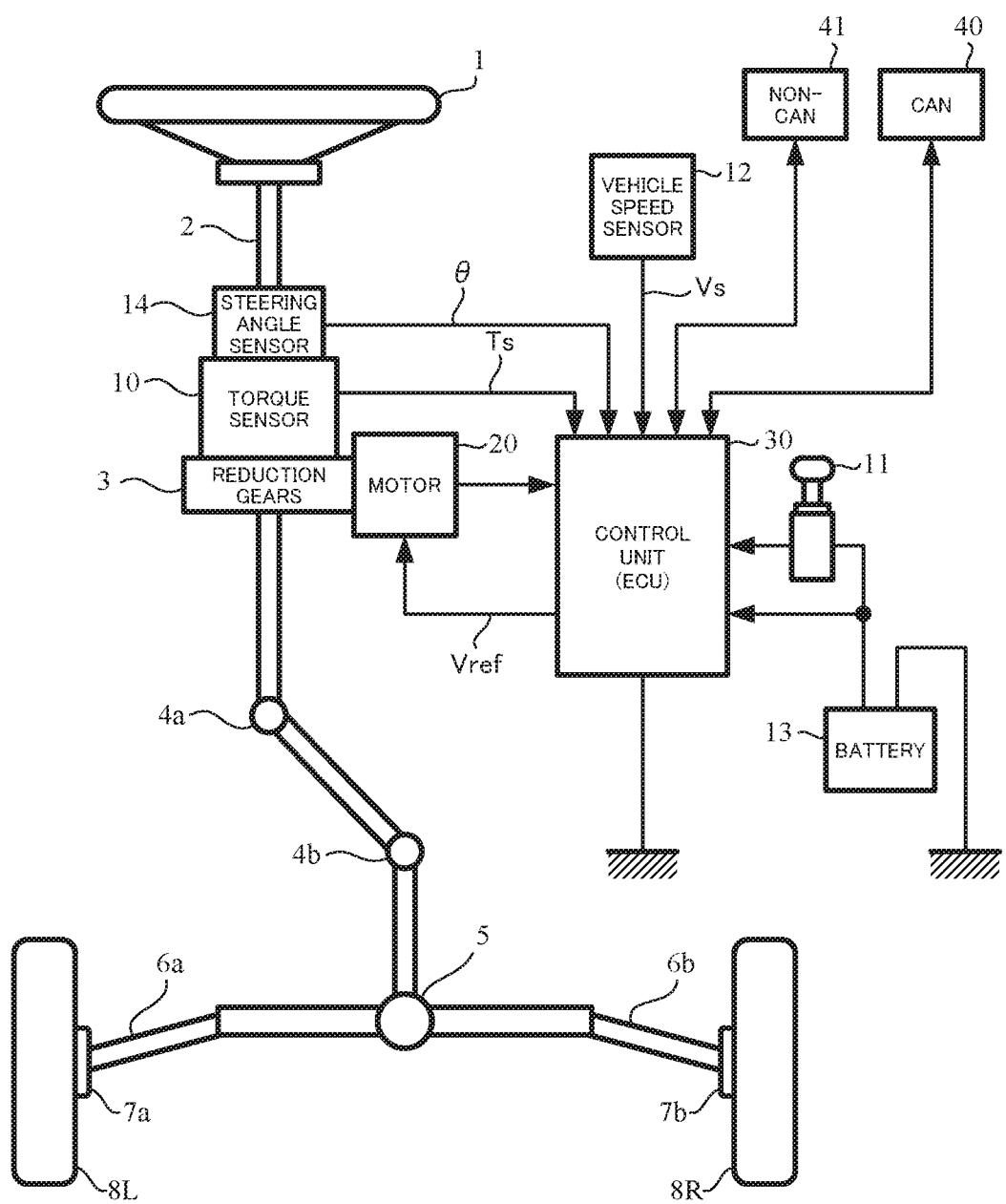
FIG. 1 is a configuration diagram illustrating a general outline of an electric power steering apparatus.
Figure 2:
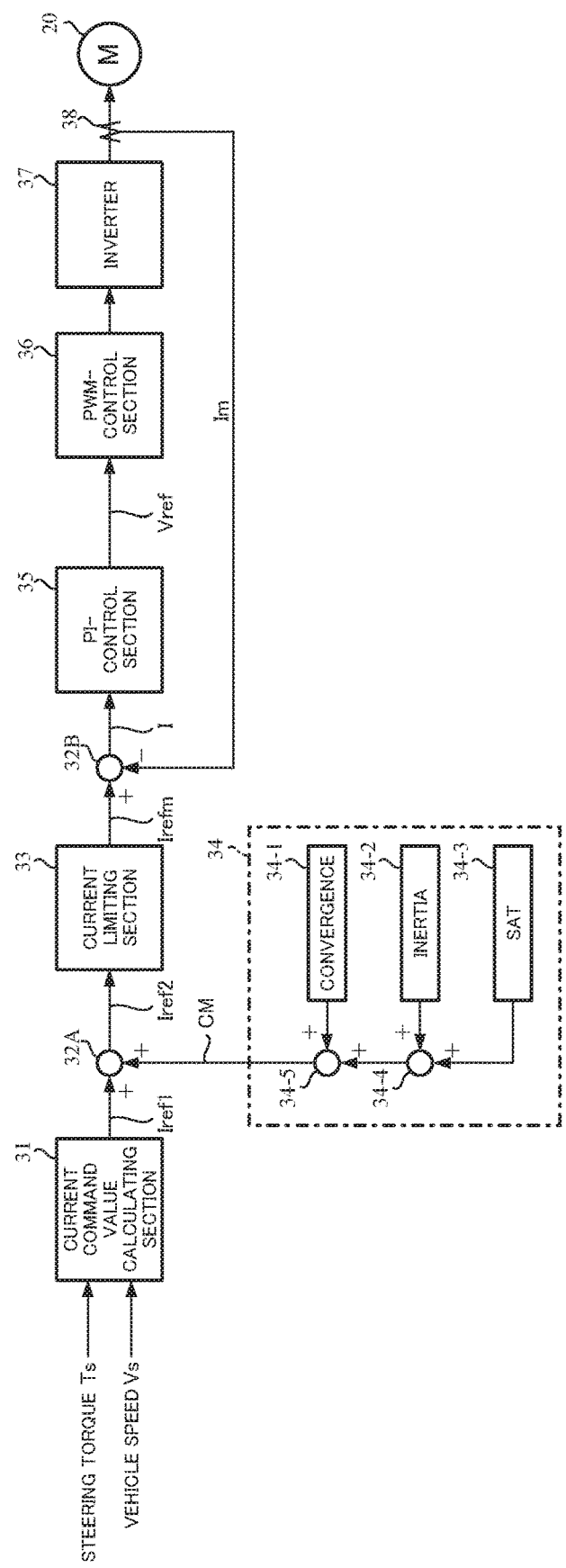
FIG. 2 is a block diagram showing a general configuration example of a control system of the electric power steering apparatus.
Figure 3:
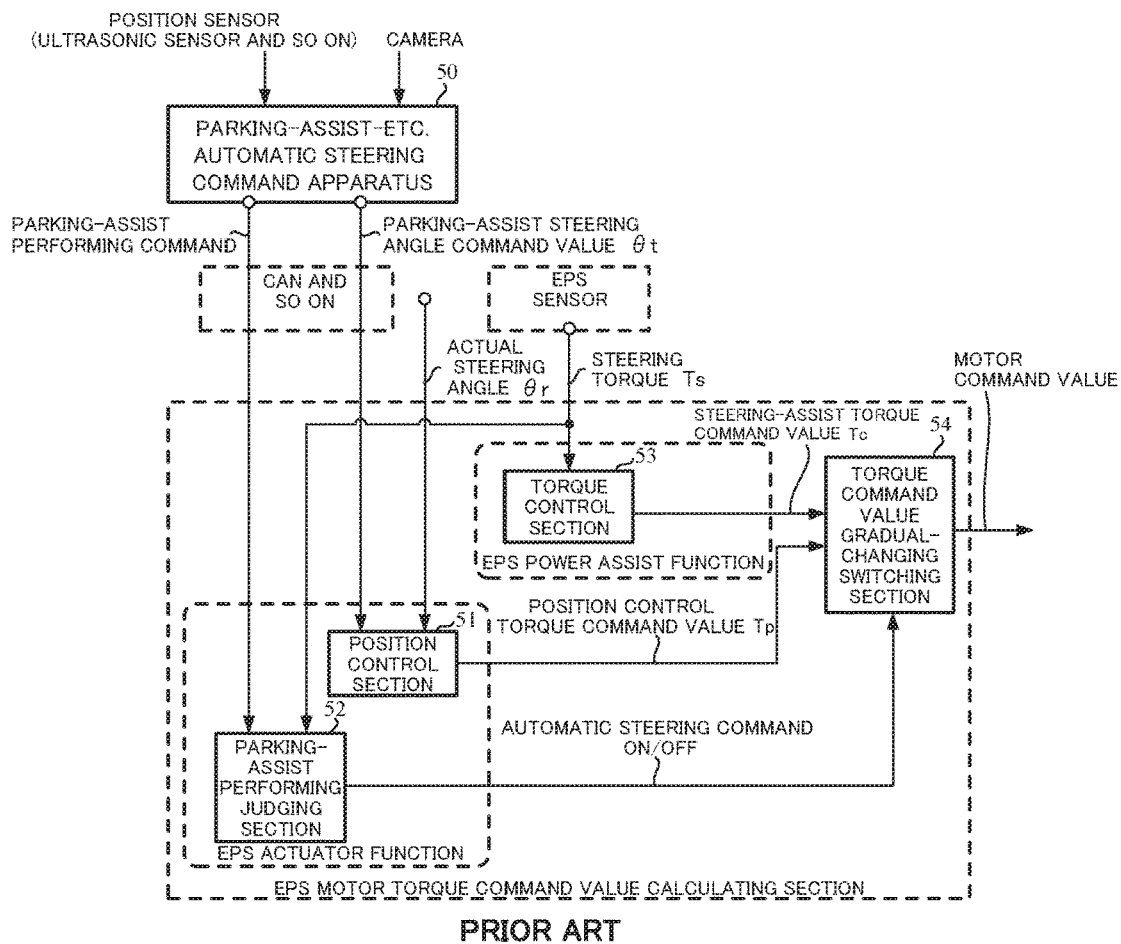
FIG. 3 is a block diagram showing a configuration example of a control system of the electric power steering apparatus having an automatic steering mode function.
Figure 4A:
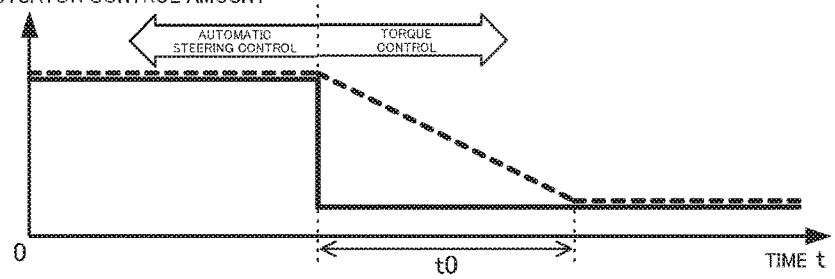
FIG. 4A and FIG. 4B are characteristic diagrams showing an operation system of the conventional electric power steering apparatus.
Figure 4B:
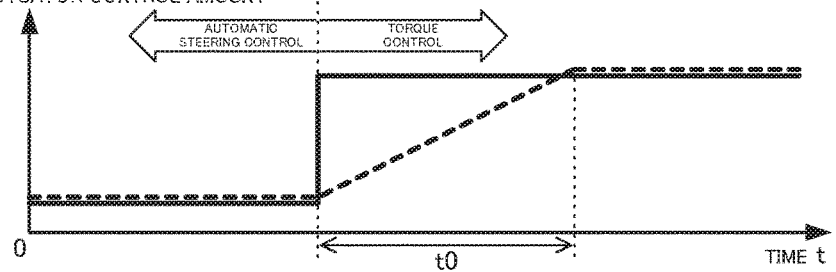
Figure 5:
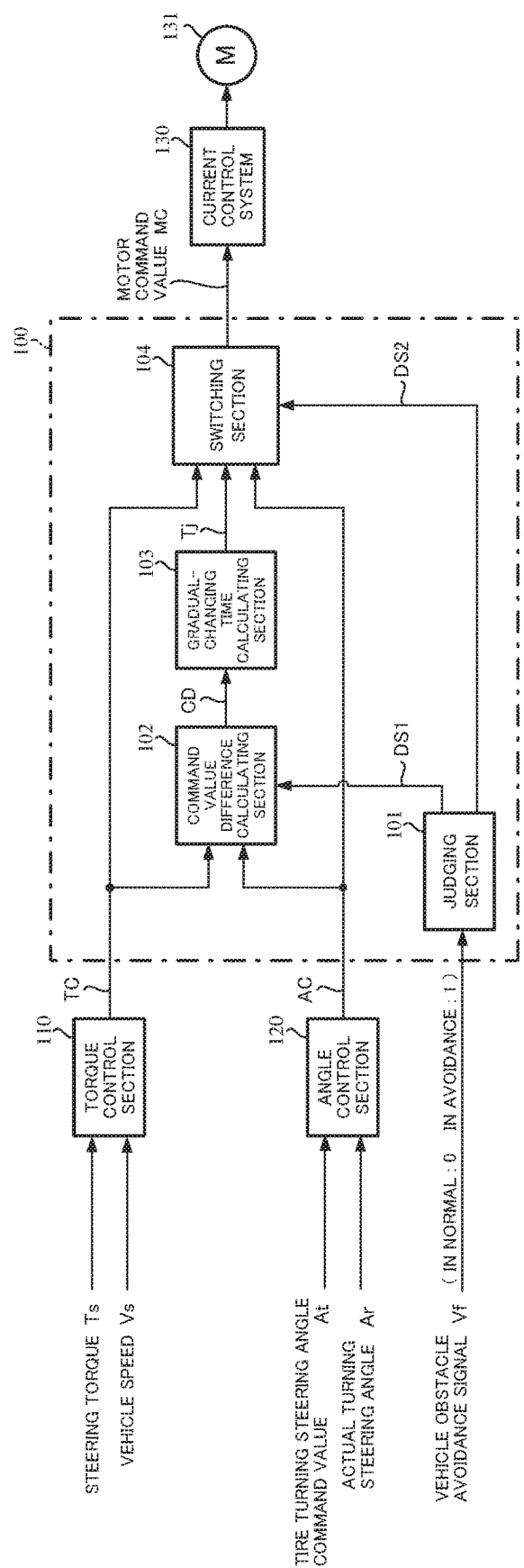
FIG. 5 is a block diagram showing a configuration example (a vehicle obstacle avoidance function) of the present invention.

FIG. 5 shows a configuration example of the present invention. The steering torque Ts and the vehicle speed Vs are inputted into a torque control section 110, and the torque control section 110 calculates a torque control command value TC based on the steering torque Ts and the vehicle speed Vs. A tire-turning steering angle command value At and an actual turning steering angle Ar are inputted into an angle control section 120, and the angle control section 120 calculates an angle control command value AC based on the tire-turning steering angle command value At and the actual turning steering angle Ar. The torque control command value TC from the torque control section 110 is inputted into a command value difference calculating section 102 and a switching section 104 in a switching control section 100, and the angle control command value AC from the angle control section 120 is inputted into the command value difference calculating section 102 and the switching section 104 in the switching control section 100.

A vehicle obstacle avoidance signal Vf as a switching trigger (a logical value is "0" in normal, and a logical value is "1" in avoidance) is inputted into a judging section 101 in the switching control section 100, and the judging section 101 judges whether the vehicle obstacle avoidance signal Vf is varied from "0" to "1", or whether the vehicle obstacle avoidance signal Vf is varied from "1" to "0". When the judging section 101 judges that the vehicle obstacle avoidance signal Vf is varied from "0" to "1", the judging section 101 outputs a judging signal DS2, and the judging signal DS2 is inputted into the switching section 104. When the judging section 101 judges that the vehicle obstacle avoidance signal Vf is varied from "1" to "0", the judging section 101 outputs a judging signal DS1, and the judging signal DS1 is inputted into the command value difference calculating section 102.

When the judging signal DS1 is inputted into the command value difference calculating section 102, the command value difference calculating section 102 calculates the command value difference CD which is an absolute value of a difference between the torque control command value TC and the angle control command value AC. That is, the command value difference CD is calculated by a following Equation 1.

command value difference CD=|torque control command value TC−angle control command value AC| [Equation 1]

Figure 6:
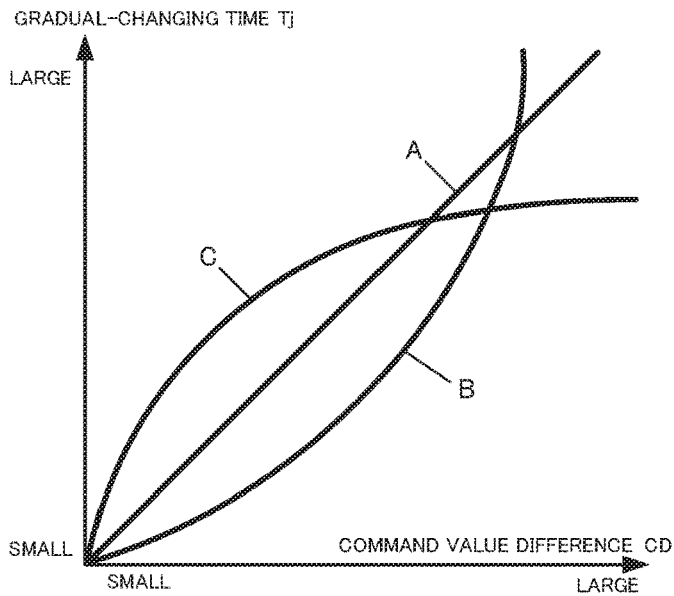
FIG. 6 is a characteristic diagram showing a characteristic example of a gradual-changing time calculating section according to the present invention.

The command value difference CD is inputted into a gradual-changing time calculating section 103, and the gradual-changing time calculating section 103 calculates a gradual-changing time Tj corresponding to the command value difference CD by using, for example, calculating equations having characteristics A, B or C of FIG. 6.

gradual-changing time $Tj$=(gradual-changing time transform coefficient)×(command value difference CD) [Equation 2]

The characteristic A is an example of linear calculating, and the characteristics B and C are examples of non-linear calculating. The gradual-changing time Tj, which is calculated at the gradual-changing time calculating section 103, is inputted into the switching section 104, and the switching section 104 switches from the angle control to the torque control by a gradual-changing characteristic (the gradual-changing time Tj) as shown in, for example, FIG. 7. That is, the control mode is the angle control (100%) before a time point t11. When the vehicle obstacle avoidance signal Vf is varied from "1" to "0" at the time point t11, the switching section 104 switches to the torque control by a linear characteristic until a time point t12 in accordance with the gradual-changing time Tj. The control mode is the torque control (100%) after the time point t12.

An output of the switching section 104 is outputted as a motor command value MC, and the motor command value MC is inputted into a current control system 130. A motor 131 for assist is driving-controlled via the current control system 130.

Figure 8:
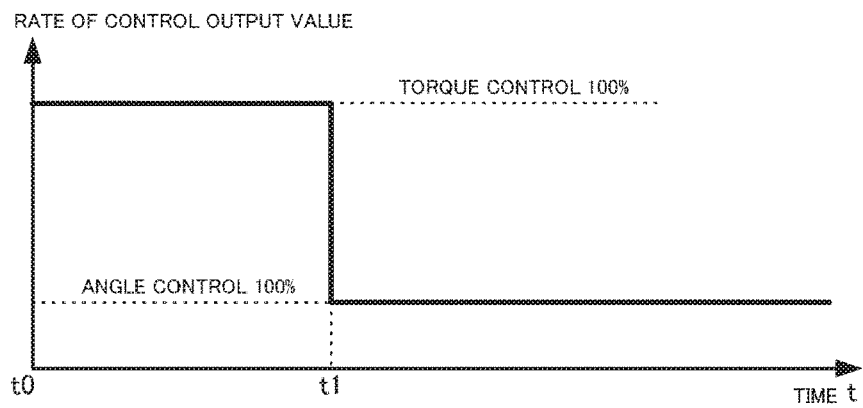
FIG. 8 is a timing chart showing a switching example from a torque control to an angle control.

When the judging section 101 judges that the vehicle obstacle avoidance signal Vf is varied from "0" to "1", the judging section 101 outputs the judging signal DS2, and the judging signal DS2 is inputted into the switching section 104. Since the switching section 104 has a step characteristic as shown in FIG. 8, when the judging signal DS2 is inputted at the time point t1, the control mode is instantaneously switched from the torque control (100%) to the angle control (100%).

Figure 9:
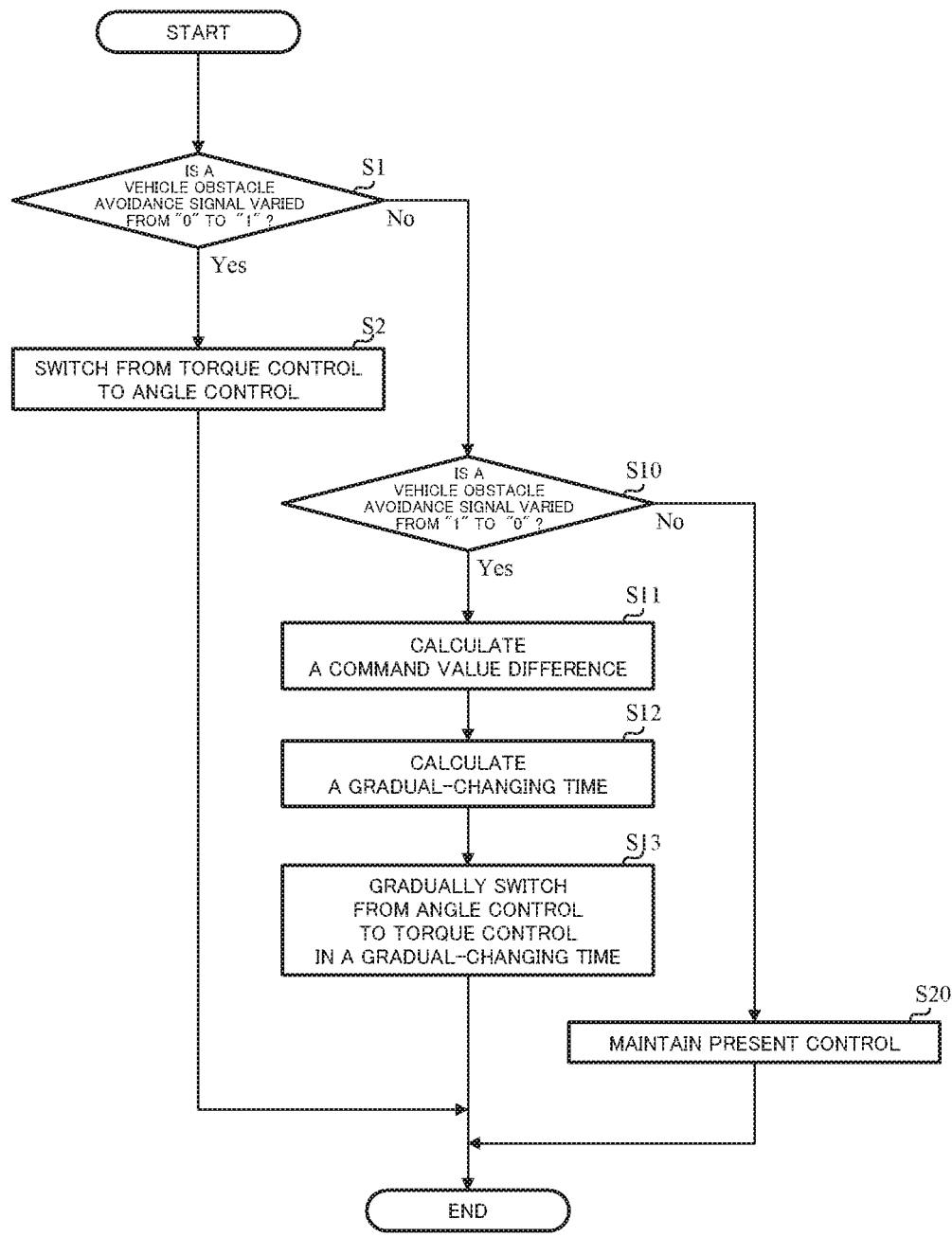
FIG. 9 is a flowchart showing an operation example of the present invention.

In such a configuration, an operation example will be described with reference to a flowchart of FIG. 9.

At first, the judging section 101 judges whether the vehicle obstacle avoidance signal Vf is varied from "0" to "1" or not (Step S1). When the vehicle obstacle avoidance signal Vf is varied from "0" to "1", the judging section 101 outputs the judging signal DS2, and the switching section 104 switches from the torque control to the angle control (Step S2). Thereby, the angle control is performed.

Figure 7:
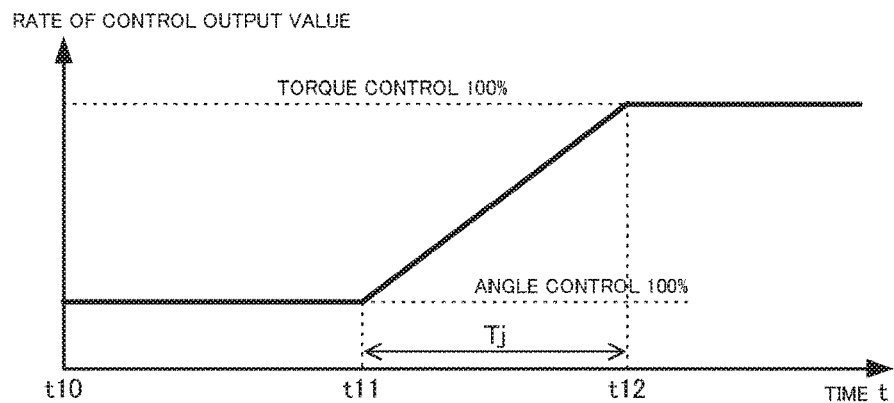
FIG. 7 is a timing chart showing an operation example of gradual-changing (linear) according to the present invention.

In the above Step S1, when the judging section 101 does not judge that the vehicle obstacle avoidance signal Vf is varied from "0" to "1", the judging section 101 judges whether the vehicle obstacle avoidance signal Vf is varied from "1" to "0" or not (Step S10). When the judging section 101 judges that the vehicle obstacle avoidance signal Vf is varied from "1" to "0", the judging section 101 outputs the judging signal DS1, and the judging signal DS1 is inputted into the command value difference calculating section 102. Thereby, the command value difference calculating section 102 calculates the command value difference CD which is the absolute value of the difference between the torque control command value TC and the angle control command value AC (Step S11). The calculated command value difference CD is inputted into the gradual-changing time calculating section 103, the gradual-changing time calculating section 103 calculates the gradual-changing time Tj which has a characteristic as shown in FIG. 6, and is a longer time when the command value difference CD is larger (Step S12). The gradual-changing time Tj is inputted into the switching section 104, and the switching section 104 gradually switches from the angle control to the torque control by the gradual-changing process as shown in FIG. 7 in accordance with the gradual-changing time Tj (Step S13).

On the other hand, in the above Step S10, in a case that the vehicle obstacle avoidance signal Vf is not varied from "1" to "0", the present control is maintained (Step S20).

Figure 10:
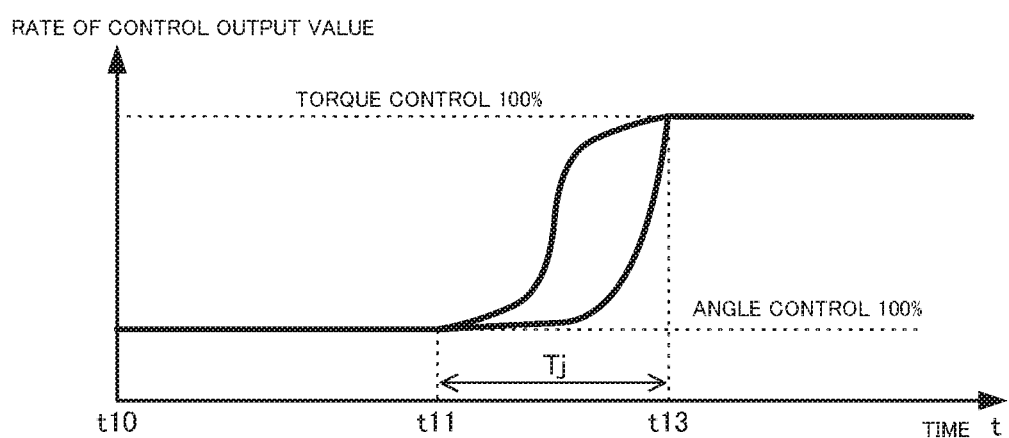
FIG. 10 is a timing chart showing another operation example of gradual-changing (non-linear) according to the present invention.

As described above, the vehicle obstacle avoidance signal Vf is used as the logical value "0" in normal and the logical value "1" in avoidance. An inverse judging may be used by using the vehicle obstacle avoidance signal Vf as the logical value "1" in normal and the logical value "0" in avoidance. The characteristic of the gradual-changing process may be a non-linear gradual-changing characteristic as shown in FIG. 10.

EXPLANATION OF REFERENCE NUMERALS 1 handle (steering wheel)
2 column shaft (steering shaft, handle shaft)
10 torque sensor
12 vehicle speed sensor
13 battery
20 motor
21 motor driving section
30 control unit (ECU)
40 CAN
41 Non-CAN
50 parking-assist-etc. automatic steering command apparatus
51 position control section
52 parking-assist performing judging section
53 torque control section
54 torque command value gradual-changing switching section
100 switching control section
101 judging section
102 command value difference calculating section
103 gradual-changing time calculating section
104 switching section
110 torque control section
120 angle control section
130 current control system
131 motor

The invention claimed is:

1. An electric power steering apparatus that has a torque sensor which detects a steering torque, and a motor control apparatus to control a motor which applies an assist torque, by which steering is assisted, to a steering system of a vehicle, comprising:
a switching control section that switches a control system of said motor between an angle control system to control an angle corresponding to an angle control command value of an automatic steering mode and a torque control system to control a torque corresponding to a torque control command value of a manual steering mode in accordance with a predetermined switching trigger, wherein said angle control command value is calculated based on at least a tire-turning steering angle command value, wherein said torque control command value is calculated based on at least said steering torque, wherein said switching control section comprises:

a judging section to judge said predetermined switching trigger, generate a first judging signal which indicates a switching from said angle control system to said torque control system and generate a second judging signal which indicates a switching from said torque control system to said angle control system;

a command value difference calculating section to calculate a command value difference, which is an absolute value of a difference between said torque control command value and said angle control command value, when said first judging signal is inputted;

a gradual-changing time calculating section to calculate a gradual-changing time which non-linearly and smoothly varies to monotonically increase corresponding to said command value difference; and a switching section to gradually switch from said angle control system to said torque control system in response to said torque control command value, said angle control command value and said gradual-changing time, wherein said electric power steering apparatus variably sets said gradual-changing time corresponding to said command value difference between said angle control command value and said torque control command value, and sets said gradual-changing time longer in case that said command value difference is larger when switching from said angle control system to said torque control system by gradual-changing, wherein said electric power steering apparatus instantaneously switches from said torque control system to said angle control system when said second judging signal is inputted into said switching section, wherein said electric power steering apparatus realizes steering which has safety and suppresses an uncomfortable feeling when switching from said angle control system to said torque control system.

2. The electric power steering apparatus according to claim 1, wherein said predetermined switching trigger is a turning-ON or a turning-OFF of an automatic steering command.

3. The electric power steering apparatus according to claim 2, wherein said turning-ON or said turning-OFF of said automatic steering command is a command of a parking assist, a command of an obstacle avoidance or a command of a lane keeping.

4. The electric power steering apparatus according to claim 1, wherein said predetermined switching trigger is a turning-ON or a turning-OFF of a switching command which is given by an internal judgment of said steering torque.

5. The electric power steering apparatus according to claim 1, wherein said gradual-changing is performed linearly.

6. The electric power steering apparatus according to claim 2, wherein said gradual-changing is performed linearly.

7. The electric power steering apparatus according to claim 3, wherein said gradual-changing is performed linearly.

8. The electric power steering apparatus according to claim 4, wherein said gradual-changing is performed linearly.

9. The electric power steering apparatus according to claim 1, wherein said gradual-changing is performed non-linearly.

10. The electric power steering apparatus according to claim 2, wherein said gradual-changing is performed non-linearly.

11. The electric power steering apparatus according to claim 3, wherein said gradual-changing is performed non-linearly.

12. The electric power steering apparatus according to claim 4, wherein said gradual-changing is performed non-linearly.

* * * * *